Figure 1:
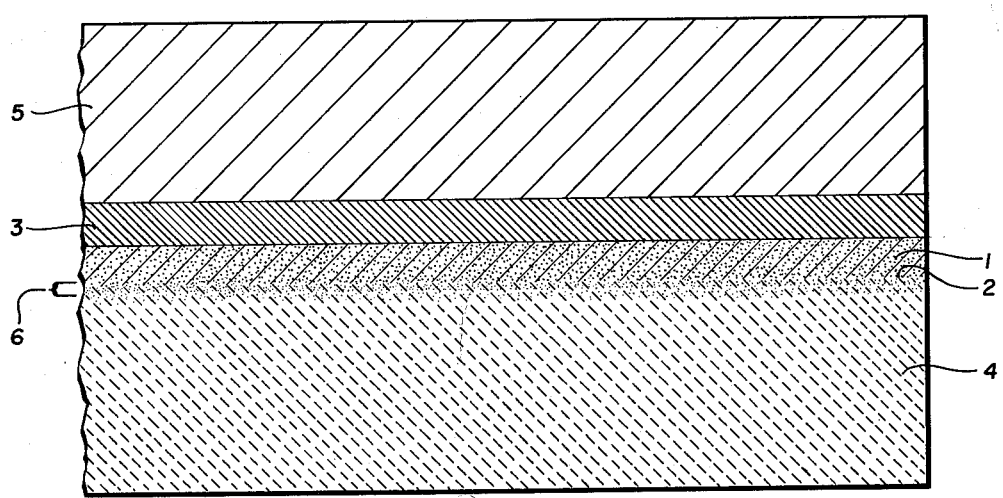

May 5, 1964     C. S. PEARSALL     3,132,044
METALIZED CERAMIC FOR BONDING TO METALS
Filed Nov. 19, 1957

INVENTOR.
Cortland S. Pearsall
BY
*Paul B. Hunter*
Attorney

United States Patent Office 3,132,044
Patented May 5, 1964

3,132,044
METALIZED CERAMIC FOR BONDING
TO METALS
Cortland S. Pearsall, Los Altos, Calif., assignor to Varian Associates, Palo Alto, Calif., a corporation of California
Filed Nov. 19, 1957, Ser. No. 697,475
3 Claims. (Cl. 117—123)

This invention relates in general to the vacuum-tight bonding of ceramics to metal and more particularly to a novel and relatively inexpensive metalized ceramic bond and method for producing the same, said metalized ceramic bond being capable of providing an extremely durable, high temperature resistant adherence to metal whereby relatively high vacuums are retained.

It is well-known that ceramic, because of its mechanical strength, temperature resistance, dielectric properties and the ease with which it lends itself to automatic assembly of electron tube structures, plays an all-important role in their production. Since electron tube structures invariably comprise metal members, it becomes necessary to provide techniques for bonding these metal members to ceramic members whereby the full advantage of the benefits accruing to the use of ceramic can be gained. Furthermore, with the advances made in the velocities of missiles both present and planned for the future, and with electron emission devices often located in the front end portion of said missiles where environmental abuse is most severe, there is a growing demand for electron emission devices that are shock resistant and can operate at elevated temperatures. It is therefore of utmost importance to have a technique whereby the bonding between ceramic and metal members of electron emission devices does not deteriorate at high temperatures and therefore does not become a limiting factor in the design of high operating temperature tubes.

The metalizing of ceramics has more or less been divided into two classifications. First there is the metalizing of forsterites which by their chemistry have low mechanical strength and are generally susceptible of relatively low temperature bonding to metals. Secondly, there is the metalizing of aluminas which by their chemistry are not generally as lossy as the forsterites at high frequencies, high high mechanical strength and are extremely susceptible to high temperature bonding with metals. It is the second classification to which the present invention relates.

Heretofore, techniques for metalizing ceramics invariably involved steps wherein the metalizing material such as, for example, a mixture of critical percentages of manganese and a metal selected from the group consisting of molybdenum, tungsten, and iron, suspended in molten material was kept in intimate contact with the ceramic surface to be metalized until metalizing occurred.

The disadvantages of this prior art technique lie in the fact that, unless the oxidation during the process was critically controlled, the metal powders would over-oxidize and yield weak bonds. In addition, the prior art process would invariably produce a glazing or glassy phase which manifests itself in mechanically weak and leaky bonds and also limits the upper temperature to which the metalized ceramic may be brazed to metal. It goes without saying that bonding materials which are separately introduced and maintain their identity in the finished seal, should be temperature resistant up to the maximum temperature to which the seal is exposed during processing of the tube and during its operational life. Moreover, if the furnace temperature is not carefully controlled other difficulties arise. As an illustration, if the furnace temperature is too low there is poor penetration of the metalizing mixture into the ceramic, and conversely if the furnace temperature is too high, the glass formed will coat the metalized layer and thereby prohibit effective brazing to metal. Furthermore, due to the critically controlled steps necessary in the prior art techniques, a technique successfully practiced in one plant may not be readily successful when attempted by another plant unless exactly the same materials, the same metalizing composition and the same equipment are used; one might even add unless the same personnel perform the process, because the human element naturally enters into the industrial process and must be taken into account.

In summary, the prior art techniques, because of their premium on caution and extremely close control, have resulted in high manufacturing expense and high reject percentages which has been the bane of high production requirements.

I have succeeded in developing a metalized ceramic bond and a process for producing the same for bonding ceramics to metals and alloys, said process, because of its substantially reduced requirements of critical control, readily lends itself to a successful transfer from the laboratory to the production line and from plant to plant.

This new metalizing process extends the high temperature brazing range of vacuum seals. In addition the product of this new process exhibits an unusually high resistance to the deterioration of the seal in contact with molten brazing metal or alloys and also possesses great mechanical strength and is therefore readily adaptable for use in aircraft and missiles. Whereas high temperature brazing of ceramic to metal type seals has been, in general, limited to copper or lower melting point metals in the past, with this new process it is now possible to braze seals with alloys such as copper-platinum which has a melting point at 1250° C. In addition, this new process allows a metalized ceramic to be in contact with liquefied copper at 1150° C. for periods of time up to 30 minutes displaying little or no loss of bond strength in the metal to ceramic type seal.

It is, therefore, the principal object of the present invention to provide a new, novel and relatively inexpensive metalized ceramic bond and to teach a method for producing the same whereby strong, high temperature resistant, vacuum seal bonding to metals and alloys results.

The present invention involves the discovery that when certain oxides, such as, for example, the oxides of chromium and columbium and mixtures thereof are mixed in certain proportions with powders of certain refractory metals, the resulting mixture, hereinafter referred to as the metalizing mixture, when used in conjunction with and as an integral part of the following described process, yields a metalized ceramic which is capable of meeting the object of the present invention.

Figure 3:
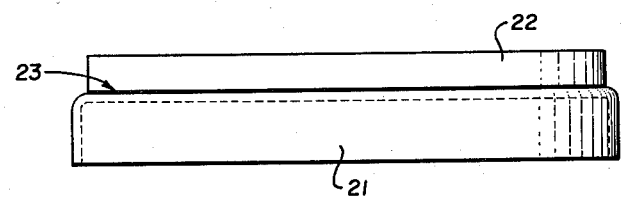
Figure 2:
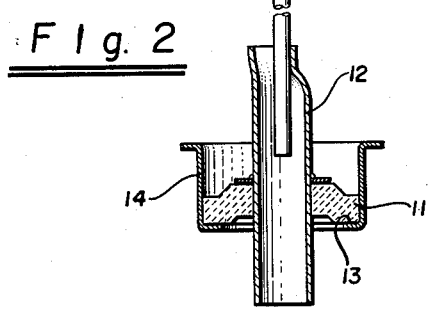

The advantages of the present invention will be more apparent after a perusal of the following specification taken in connection with the accompanying drawings wherein, FIG. 1 is a cross sectional view depicting the apparatus of the present invention, and FIGS. 2 and 3 are typical applications of the present invention.

A metal taken from the group consisting of molybdenum, tungsten, iron and rhenium in metallic powder form is submerged in a liquid, such as, for example, acetone or methanol to prevent oxidation of said particles and to provide a vehicle for suspension. The submerged particles are thoroughly mixed with the liquid and the mixture thus formed is caused to settle, the larger particles settling more rapidly. The finer particles are decanted off. These decanted particles are then mixed with a fine powder consisting of an oxide selected from the group consisting of chromium and columbium which are compatible with ceramic. It has been found that mixtures of approximately 20 to 30% oxide and respectively 80 to 70% of the metal powder yield good results. A paint is produced by thoroughly mixing a suitable vehicle for suspension, such as, for example, nitrocellulose solution with the metalizing mixture. The desired viscosity of the suspended mixture for metalizing is obtained by adding greater or lesser quantities of a solvent such as, for example, amyl acetate. The metalizing bonding mixture 1 is then painted, sprayed or silk screened onto the surface 2 of the ceramic member 4 to be metalized. The coated ceramic is then fired in a hydrogen atmosphere at from 1500° C. to 1650° C. for from 10 to 20 minutes. During firing, a physical, chemical reaction, namely diffusion, takes place wherein there is an intermigration of molecules and atoms of both the metalizing mixture and the ceramic 6. The moisture content of the reducing hydrogen atmosphere is controlled by bubbling hydrogen through water. A mixture of hydrogen-nitrogen can also be used and, in fact, is less expensive than pure hydrogen. The metalized ceramic resulting from this process may now be brazed directly to a metal or alloy member 5 or electroplated with copper or nickel or may be coated by reducing salts of these metals in hydrogen for subsequent brazing.

FIG. 2 shows a klystron reflector stem assembly illustrating a typical application of the present invention for high operating temperature uses depicting a cylindrical kovar member 12 upon which is mounted an annular ceramic member 11 brazed along the metalized ceramic surface 13 to a cylindrical kovar member 14 thereby forming a portion of the vacuum seal of the assembly.

FIG. 3 depicts another typical application of the present invention involving lead through window irises between internal and external cavities as of a klystron wherein a ceramic window member 22 is brazed along its metalized surface 23, using the novel bond of this invention, to a platinum mounting frame member 21 thereby retaining a vacuum-tight seal between the active portion of the klystron and the external cavities.

The process of the present invention allows substantially elevated brazing temperatures because the melting points of the compatible oxides, supra, are extremely high. Therefore, high temperature brazing alloys such as, for example, copper-platinum 3 can now be employed whereby there is no longer the danger of molten brazing metals penetrating and deteriorating the metalized ceramic whereby the seal is violated. In addition, the time to which the metalized ceramic is exposed to brazing temperatures is now critical.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A metalized ceramic for bonding to metals and alloys including, a ceramic member, a metalized mixture forming a layer tenaciously adhering to the ceramic member, said metalized mixture consisting of 70 to 80% by weight of metal selected from the group of molybdenum, tungsten, rhenium and iron with 20 to 30% by weight of metal oxide selected from the group of chromium oxide and columbium oxide, said metalizing mixture being intermingled with the ceramic member whereby an inseparable adhering metal coating is formed thereon.

2. The metalized ceramic according to claim 1, wherein said group of metal oxides includes only chromium oxide.

3. The metalized ceramic according to claim 1, wherein said group of metal oxides includes only columbium oxide.

References Cited in the file of this patent

UNITED STATES PATENTS

| | | |
|---|---|---|
| 1,970,759 | Mattman | Aug. 21, 1934 |
| 2,139,431 | Vatter | Dec. 6, 1938 |
| 2,450,130 | Gordon et al. | Sept. 28, 1948 |
| 2,667,432 | Nolte | Jan. 26, 1954 |
| 2,686,958 | Eber et al. | Aug. 24, 1954 |
| 2,708,787 | Chick et al. | May 24, 1955 |
| 2,722,496 | Hosmer | Nov. 1, 1955 |
| 2,775,531 | Montgomery et al. | Dec. 25, 1956 |
| 2,776,472 | Mesick | Jan. 8, 1957 |
| 2,800,710 | Dunn | July 30, 1957 |
| 2,820,727 | Grattidge | Jan. 21, 1958 |
| 2,835,967 | Umblia | May 27, 1958 |
| 2,844,867 | Wernz | July 29, 1958 |
| 2,874,067 | Sommer et al. | Feb. 17, 1959 |
| 2,902,756 | Cavanaugh | Sept. 8, 1959 |
| 2,903,788 | Pryslak | Sept. 15, 1959 |
| 2,996,401 | Welch et al. | Aug. 15, 1961 |

FOREIGN PATENTS

| | | |
|---|---|---|
| 502,273 | Great Britain | Mar. 15, 1939 |

OTHER REFERENCES

Ceramic Age, April 1954, pp. 17–21, 46 and 47.

Electron Tubes for Critical Environments, page 63, ASTIA Document No. AD151158, Wright Air Development Center Technical report 57–434, published March 1958. Copy in Div. 54. Copies may be obtained from the ASTIA Document Service Center, Arlington Hall Station, Arlington 12, Va.

UNITED STATES PATENT OFFICE
CERTIFICATE OF CORRECTION

Patent No. 3,132,044                  May 5, 1964

Cortland S. Pearsall

It is hereby certified that error appears in the above numbered patent requiring correction and that the said Letters Patent should read as corrected below.

Column 1, line 45, for "high high" read -- have high --; column 3, line 49, for "critical" read -- uncritical --.

Signed and sealed this 9th day of February 1965.

SEAL)
Attest:

ERNEST W. SWIDER
Attesting Officer

EDWARD J. BRENNER
Commissioner of Patents